(12) United States Patent
Knausz

(10) Patent No.: US 12,444,932 B2
(45) Date of Patent: Oct. 14, 2025

(54) BIOMETRIC SENSOR AND SYSTEM LEVEL ELECTROSTATIC DISCHARGE (ESD) PROTECTION

(71) Applicant: IDEX BIOMETRICS ASA, Oslo (NO)

(72) Inventor: Imre Knausz, Fairport, NY (US)

(73) Assignee: IDEX Biometrics ASA, Oslo (NO)

(*) Notice: Subject to any disclaimer, the term of this patent is extended or adjusted under 35 U.S.C. 154(b) by 184 days.

(21) Appl. No.: 18/166,528

(22) Filed: Feb. 9, 2023

(65) Prior Publication Data
US 2024/0275164 A1 Aug. 15, 2024

(51) Int. Cl.
H02H 9/04 (2006.01)
G06K 19/077 (2006.01)

(52) U.S. Cl.
CPC ....... *H02H 9/045* (2013.01); *G06K 19/07771* (2013.01)

(58) Field of Classification Search
CPC .......... H02H 9/045; G06K 19/07771

USPC .......... 361/56
See application file for complete search history.

(56) References Cited

U.S. PATENT DOCUMENTS

| 6,069,970 | A  | * | 5/2000 | Salatino | G06V 40/1306 |
| | | | | | 235/380 |
| 6,628,812 | B1 | * | 9/2003 | Setlak | G06F 1/1616 |
| | | | | | 382/124 |
| 2013/0119488 | A1 | * | 5/2013 | Sherlock | H05K 1/028 |
| | | | | | 361/752 |
| 2017/0277936 | A1 | * | 9/2017 | Slottner | G06V 40/1329 |
| 2019/0286868 | A1 | * | 9/2019 | Suwald | G06V 40/1329 |

* cited by examiner

*Primary Examiner* — Sreeya Sreevatsa
(74) *Attorney, Agent, or Firm* — Smith Tempel Blaha LLC/IDEX Biometrics; Michael J. Tempel

(57) ABSTRACT

A system for electrostatic discharge (ESD) protection on a smart card includes a substrate having a biometric sensor mounted thereon, and a conductive element mounted to the substrate, wherein a current induced by an ESD strike is conducted to a ground through the conductive element and the substrate.

15 Claims, 10 Drawing Sheets

BIOMETRIC SENSOR AND SYSTEM LEVEL ELECTROSTATIC DISCHARGE (ESD) PROTECTION

BACKGROUND

Remote biometric user authentication is becoming more and more ubiquitous as a way of verifying a user's identity and securely requesting the authorization of transactions initiated by that user and for other actions. Biometric authentication for example, fingerprint matching, can be performed using an electronic device in the user's possession e.g., a smart card. In this example, a user's identity may be verified by comparing a fingerprint sample provided by the user to a trusted biometric template of that user. A trusted biometric template may be created by, for example, obtaining and storing one or more trusted samples of a user's fingerprint (or portions of a fingerprint) in a trusted template. Subsequent fingerprint samples are compared against the trusted template to authenticate the user. The trusted template may also be referred to as a trusted biometric template or a verification template.

A smart card typically has circuitry and circuit elements that may be susceptible to damage caused by excessive voltages and induced currents as a result of electrostatic discharge (ESD). A smart card typically must meet certain ESD standards. For example, standards such as IEC 10373-1 and IEC 61000-4-2 establish voltage discharge standards that manufacturers of smart cards strive to meet. An example of a level 3 standard under IEC 61000-4-2 dictates that a smart card withstand 6 kV contact discharge and 8 kV air discharge, for example.

Existing methodologies for increasing the ESD robustness of a smart card include, for example, adding ground pads or metal structures to the sensor and including dielectric coatings over the sensor. However, these solutions add cost, complexity and also affect the signal to noise ratio (SNR) and power consumption of the smart card. In some cases, the added ground pads may also attract unwanted ESD voltage.

Therefore, it is desirable to increase the electrical ESD robustness of a smart card while minimizing complexity, power consumption and sensor coating thickness.

SUMMARY

In an exemplary embodiment, a system for electrostatic discharge (ESD) protection on a smart card includes a substrate having a biometric sensor mounted thereon, and a conductive element mounted to the substrate, wherein a current induced by an ESD strike is conducted to a ground through the conductive element and the substrate.

In another exemplary embodiment, a method for electrostatic discharge (ESD) protection in a smart card includes receiving an ESD strike on a smart card, and routing a current associated with the ESD strike to a ground bypassing an integrated circuit (IC) located on the smart card.

In another exemplary embodiment, a device for electrostatic discharge (ESD) protection in a smart card including means for receiving an ESD strike on a smart card, and means for routing a current associated with the ESD strike to a ground bypassing an integrated circuit (IC) located on the smart card.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

Exemplary embodiments can be better understood with reference to the following drawings. The components in the drawings are not necessarily to scale, emphasis instead being placed upon clearly illustrating the principles of the present invention.

DETAILED DESCRIPTION

Figure 1:
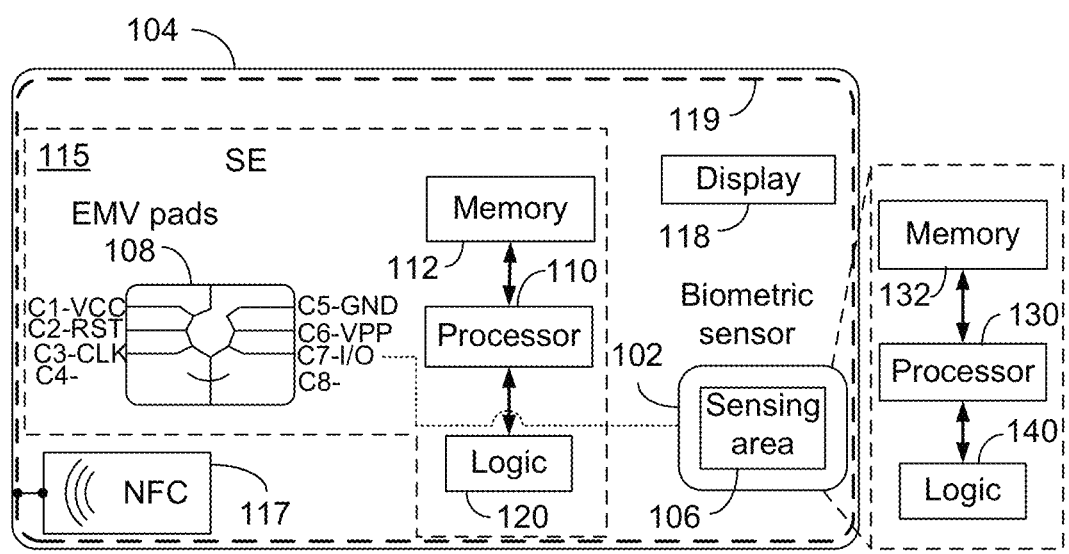
FIG. 1 illustrates a biometric sensor assembly or a biometric sensor, such as fingerprint sensor, instantiated on a smart card according to some embodiments.

While aspects of the subject matter of the present application may be embodied in a variety of forms, the following description and accompanying drawings are merely intended to disclose some of these forms as specific examples of the subject matter. Accordingly, the subject matter of this application is not intended to be limited to the forms or embodiments so described and illustrated.

Unless defined otherwise, all terms of art, notations and other technical terms or terminology used herein have the same meaning as is commonly understood by one of ordinary skill in the art to which this application belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the application and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

In an exemplary embodiment, systems and methods for electrostatic discharge (ESD) protection for a smart card are disclosed.

FIG. 1 illustrates a biometric sensor assembly or a biometric sensor, such as biometric sensor 102, installed on a user device. In an exemplary embodiment, the user device may be a smart card 104 according to some embodiments and the biometric sensor 102 may be a fingerprint sensor. In other embodiments, a user device may be a device other than a smart card, such as, for example, a wearable device, a communication device, a personal computing device, a tablet, or another user device. In the illustrated embodiment shown in FIG. 1, the smart card 104 is a limited device, as described above, and the smart card 104 comprises the biometric sensor 102. In some embodiments, the smart card 104 comprises a fingerprint, or other biometric sensor 102, processor or processing circuitry 110, memory 112, a display 118, logic 120 and contact pads 108 providing contacts for an external power source. In an exemplary embodiment, the biometric sensor 102 may also comprise processor or processing circuitry 130, memory 132 and logic 140. The contact pads 108 may be any type of input/output (I/O) interface, and as an example, may be referred to as EMV (Europay, MasterCard, Visa) pads and may be used to provide a physical connection to a POS terminal, or other host device.

The processing circuitry 110 and 130 may be a microprocessor, microcontroller, microcontroller unit (MCU), application-specific integrated circuit (ASIC), field-programmable gate array (FPGA), or any combination of components configured to perform and/or control the functions of the smart card 104. The memory 112 and 132 may be a read-only memory (ROM) such as EPROM or EEPROM, flash, or any other storage component capable of storing executory programs and information for use by the processing circuitry 110 and 130. The biometric sensor 102 may comprise sensor controlling circuitry and a sensor memory. The sensor controlling circuitry may be a microprocessor, microcontroller, application-specific integrated circuit (ASIC), field-programmable gate array (FPGA), or any combination of components configured to perform and/or control the functions of the biometric sensor 102. The sensor memory may be a read-only memory (ROM) such as EPROM or EEPROM, flash, or any other storage component capable of storing executory programs and information for use by the processing circuitry 110 and 130. The sensor controlling circuitry is configured to execute fingerprint sensor application programming (i.e., firmware) stored in the sensor memory 132. The memory 112 and the sensor memory 132 may be the same component. The sensor controlling circuitry is coupled to or may be part of the processing circuitry 110 and 130. The various components of the smart card 104 are appropriately coupled and the components may be used separately or in combination to perform the embodiments disclosed herein.

In an exemplary embodiment, the processing circuitry 110 may be connected to logic 120 and the processing circuitry 130 may be connected to logic 140. The logic 120 and 140 may comprise software, firmware, instructions, circuitry, or other devices, configured to be executed by the processing circuitry 110 and 130, respectively, to control one or more functions of the smart card 104, as described herein.

In an exemplary embodiment, the biometric sensor 102, the processor 110 and/or 130, the memory 112 and/or 132, and the logic 120 and/or the logic 140 may be configured to capture one or more submitted current biometric features corresponding to a biometric sample that may comprise one or more biometric features that form a current user identity sample provided by a user, compare the one or more current biometric sample to a previously obtained biometric sample corresponding to a previously obtained user identity sample, and if the one or more current biometric features in the biometric sample match the previously obtained biometric sample, generate an authorization signal that identifies the current user identity sample as belonging to an authorized user, the authorization signal corresponding to a user initiated successful biometric user authentication.

In another exemplary embodiment, the biometric sensor 102, the processor 110 and/or 130, the memory 112 and/or 132, and the logic 120 and/or the logic 140 may be configured to perform an enrollment process where the biometric sensor 102 collects multiple biometric samples of a user to enroll the user in the memory 112 and/or 132 of the smart card 104.

The contact pads 108 comprise one or more power transmission contacts, which may connect electrical components of the smart card 104, such as an LED, the processing circuitry 110, memory 112, display 118, sensor elements (e.g., the biometric sensor 102) etc., to an external power source. In some embodiments, the contact pads 108 further comprise one or more data transmission contacts that are distinct from the power transmission contacts which connect the smart card 104 to an external device configured to receive data from and/or transmit data to the smart card 104. In this context, the data transmission contacts of the smart card 104 are the contacts that convey data transmitted to or transmitted from the smart card 104.

In an exemplary embodiment, the display 118 may be configured to provide interactive communication with a user. For example, the display 118 may be configured to provide various information to a user. Although shown in FIG. 1 as being on a front-facing surface of the smart card 104, the display 118 may also be located on an opposite (rear-facing) surface of the smart card 104.

The processing circuitry 110, the memory 112 and the logic 120 may comprise at least part of a secure element 115. The contact pads 108 may be part of the secure element 115 which includes the processing circuitry 110, memory 112, and logic 120, all of which are in electrical communication with the contact pads 108. In an exemplary embodiment, the secure element 115 may conform to an EMVCo. power management protocol commonly used on smart cards, and the contact pads 108 provide electric contacts between the smart card 104 and a host device, such as for example, a smart phone, an enrollment sleeve, a tablet computer, an external card reader, or other host device, to provide power to the processing circuitry 110 of the card and to read data from and/or write data to the memory 112. In an exemplary embodiment, a host device, such as a smart phone, a tablet, a POS terminal, or another device, may provide temporary power to the smart card 104 using, for example, NFC technology, Qi power technology, a combination of NFC and Qi power technology, or other wireless power technology, in which case the smart card 104 includes NFC element 117 or another power element. In an exemplary embodiment, an antenna 119 may be coupled to the NFC element 117 to allow the smart card 104 to harvest NFC power from a host device, such as an NFT terminal, a POS terminal, a smart phone, a tablet, or another device. Although shown as generally occupying a periphery of the smart card 104, the antenna 119 may take other shapes and configurations. The antenna 119 may comprise metal, or metallic material, and may comprise one or more loops, or may have a meandering configuration.

In some embodiments, NFC capability may be implemented on the smart card 104 using NFC communication element 117 to communicate with a host device, and in some embodiments to allow a host device to provide power, or temporary power, to the smart card 104. NFC is a standards-based wireless communication technology that allows data to be exchanged between devices that are a few centimeters apart. NFC operates at a nominal frequency of 13.56 MHz and transfers data at up to 424 Kbits/seconds. In some embodiment, the NFC element 117 may be completely or partially part of, or contained within, the secure element 115.

When used for contactless transactions, NFC-enabled smart phones incorporate smart chips (called secure elements, similar to the secure element 115 on the smart card 104) that allow the smart phone to securely store and use the transaction application and consumer account information. Contactless transactions between an NFC-enabled mobile phone and a POS terminal use the standard ISO/IEC 14443 communication protocol currently used by EMV contactless credit and debit chip cards. NFC-enabled smart phones and other devices can also be used for a wide variety of other applications including chip-enabled mobile marketing (e.g., coupons, loyalty programs and other marketing offers), identity and access, ticketing and gaming. NFC is available as standard functionality in many mobile phones and allows consumers to perform safe contactless transactions, access digital content, and connect electronic devices simply. An NFC chip in a mobile device can act as a card or a reader or both, enabling consumer devices to share information and to make secure payments quickly.

In FIG. 1, contact pads 108 embody an exemplary smart card contact arrangement, known as a pinout. In an exemplary embodiment, contact C1, VCC, connects to a power supply. contact C2, RST, connects to a device to receive a reset signal, used to reset the card's communications. Contact C3, CLK, connects to a device to receive a clock signal, from which data communications timing is derived. Contact C5, GND, connects to a ground (reference voltage). In various embodiments, contact C6, VPP, may, according to ISO/IEC 7816-3:1997, be designated as a programming voltage, such as an input for a higher voltage to program persistent memory (e.g., EEPROM). In other embodiments, contact C6, VPP, may, according to ISO/IEC 7816-3:2006, be designated as SPU, for either standard or proprietary use, as input and/or output. Contact C7, I/O, provides Serial input and output (half-duplex). Contacts C4 and C8, the two remaining contacts, are AUX1 and AUX2 respectively and used for USB interfaces and other uses. In an exemplary embodiment, the biometric sensor 102 may communicate with the SE 115 using serial input and output capabilities of the SE 115. In some embodiments the biometric sensor 102 may be directly connected to contact C7.

In some embodiments described herein, the contact pads 108 are only used for providing connection points via the one or more power transmission contacts, such as C1 VCC and C5 GND, to an external power source, and no data is transmitted to or from the smart card 104 during an activation or enrollment process. The smart card 104 may comprise one or more power transmission contacts for connecting the smart card 104 to a power source, without any further data transmission capability as in a secure element. In other embodiments, the location of the biometric sensor 102 may be embedded into any position on the smart card 104 such that the position of the biometric sensor 102 is substantially separated from the contact pads 108 and allows a user to place a finger on the biometric sensor 102.

A user can carry out various functions on the smart card 104 by placing a finger in various positions over a sensing area 106 of the biometric sensor 102. The sensing area 106 comprises a two-dimensional array of sensor elements. Each sensor element is a discrete sensing component which may be enabled depending on the function of the biometric sensor 102. Any combination of sensor elements in the two-dimensional array may be enabled depending on the function of the biometric sensor. While the illustrated embodiment shown in FIG. 1 describes the biometric sensor 102 in relation to the smart card 104, this is not required and the biometric sensor 102, or other biometric sensor, may be incorporated in a different limited device in other embodiments. For example, other limited devices in which aspects of the technology describe herein may be incorporated include fitness monitors, wearable devices, domestic and industrial appliances, automotive components, and "Internet of things" (IOT) devices.

In some embodiments, the sensing area 106 can have different shapes including, but not limited to, a rectangle, a circle, an oval, a diamond, a rhombus, or a lozenge.

The biometric sensor 102 may comprise an array of sensor elements comprising a plurality of conductive drive lines and overlapped conductive pickup lines that are separated from the drive lines by a dielectric layer. Each drive line may thus be capacitively coupled to an overlapping pickup line through a dielectric layer. In such embodiments, the pickup lines can form one axis (e.g., X-axis) of the array, while the drive lines form another axis (e.g., Y-axis) of the array. Each location where a drive line and a pickup line overlap may form an impedance-sensitive electrode pair whereby the overlapping portions of the drive and pickup lines form opposed plates of a capacitor separated by a dielectric layer or layers. This impedance-sensitive electrode pair may be treated as a pixel (e.g., an X-Y coordinate) at which a surface feature of the proximally located object is detected. The array or grid forms a plurality of pixels that can collectively create a map of the surface features of the proximally located object. For instance, the sensor elements forming the pixels of the grid produce signals having variations corresponding to features of a fingerprint disposed over the particular sensor element and thus the pixels along with circuitry controlling the sensor elements and processing signals produced by the sensor elements that includes a processor and signal conditioning elements (i.e., "sensor controlling circuitry") that may be incorporated into an integrated circuit can map locations where there are ridge and valley features of the finger surface touching the sensor array.

Figure 2A:
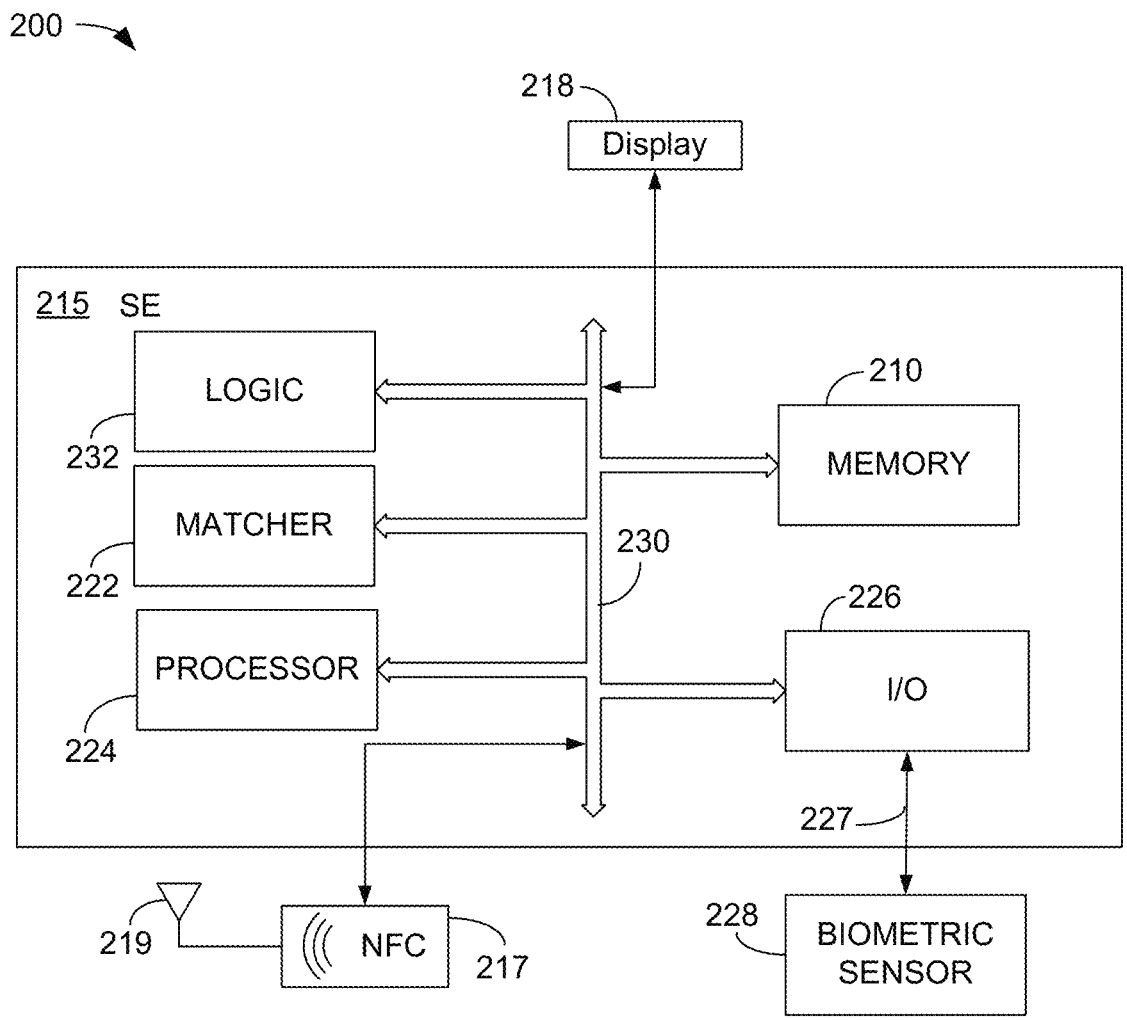
FIG. 2A illustrates a block diagram of a portion of the smart card of FIG. 1.

FIG. 2A is a block diagram 200 of a portion of the smart card of FIG. 1. In an exemplary embodiment, the portion of the smart card may comprise a secure element 215. The secure element 215 may be similar to the secure element 115 of FIG. 1. In an exemplary embodiment, the secure element 215 may comprise a processor 224, a memory 210, a matcher 222, logic 232 and an I/O element 226 operatively coupled together over a communication bus 230. A biometric sensor 228 may provide data to the I/O element 226 over connection 227. In an exemplary embodiment, the biometric sensor 228 may be a fingerprint sensor, similar to the biometric sensor 102 of FIG. 1. In an exemplary embodiment, the memory 210 may be similar to the memory 112 or the memory 132 of FIG. 1.

In an exemplary embodiment, the matcher 222 may be hardware, software, firmware, or a combination thereof, and may be configured to process samples from the biometric sensor 228 to determine whether a biometric sample provided by the biometric sensor 228 has a sufficient number of correlated features with (and/or matches or partially matches) a trusted biometric sample that may be stored in the memory 210 to allow the determination that the new or live biometric sample provided by the biometric sensor 228 belongs to the same user as does a trusted biometric sample. In some embodiments, the matching function may reside completely in the SE or parts of the matching function may reside in both an ASIC and the SE, which in some embodiments may be combined into a single element. Biometric sample matching technology is known to those having ordinary skill in the art and will not be described in detail herein.

In an exemplary embodiment, an NFC element 217 and antenna 219 may be connected to the SE 215 to allow the smart card (not shown) that is associated with the SE 215 to harvest power wirelessly. The NFC element 217 and the antenna 219 are similar to the NFC element 117 and antenna 119 described in FIG. 1.

In an exemplary embodiment, a display 218 may be connected to the SE 215 or to another processing element outside of the SE 215, to provide a display to a user. In an exemplary embodiment, the display 218 may be similar to the display 118 described in FIG. 1. In an exemplary embodiment, the processor 224 and the NFC element 217 may be configured to determine signal strength and the display 218 may be used as a signal strength indicator to display NFC signal strength to a user.

Figure 2B:
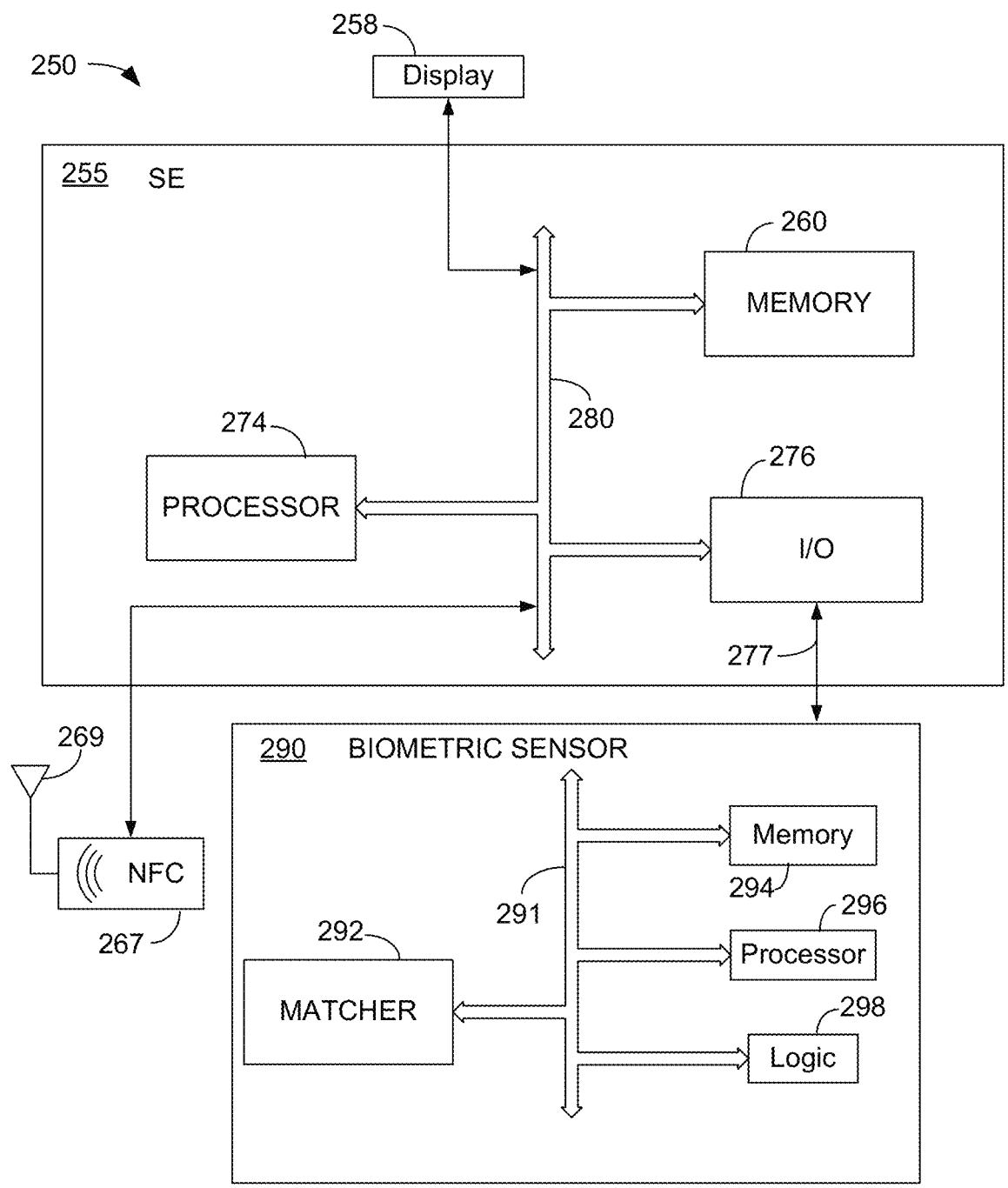
FIG. 2B illustrates an alternative exemplary embodiment of a block diagram of a portion of the smart card of FIG. 1.

FIG. 2B is block diagram 250 of an alternative exemplary embodiment of a portion of the smart card of FIG. 1. In an exemplary embodiment, the portion of the smart card may comprise a secure element 255. The secure element 255 may be similar to the secure element 115 of FIG. 1. In an exemplary embodiment, the secure element 255 may comprise a processor 274, a memory 260 and an I/O element 276 operatively coupled together over a communication bus 280. In an exemplary embodiment, a biometric sensor 290 may include a memory 294, a processor 296, logic 298 and a matcher 292. In an exemplary embodiment, the biometric sensor 290 may provide data to the I/O element 276 over connection 277. In an exemplary embodiment, the biometric sensor 290 may be a fingerprint sensor, similar to the biometric sensor 102 of FIG. 1. In an exemplary embodiment, the memory 260 may be similar to the memory 112 or the memory 132 of FIG. 1.

In an exemplary embodiment, the matcher 292 may be hardware, software, firmware, or a combination thereof, and may be configured to process samples from the biometric sensor 290 to determine whether a biometric sample provided by the biometric sensor 290 has a sufficient number of correlated features with (and/or matches or partially matches) a trusted biometric sample that may be stored in the memory 260 to allow the determination that the new or live biometric sample provided by the biometric sensor 290 belongs to the same user as does the trusted biometric sample.

In an exemplary embodiment, an NFC element 267 and antenna 269 may be connected to the SE 255 to allow the smart card (not shown) that is associated with the SE 255 to harvest power wirelessly. The NFC element 267 and the antenna 269 are similar to the NFC element 117 and antenna 119 described in FIG. 1.

In an exemplary embodiment, a display 258 may be connected to the SE 255 or to another processing element outside of the SE 255, to provide a display to a user. In an exemplary embodiment, the display 258 may be similar to the display 118 described in FIG. 1. In an exemplary embodiment, the processor 274 and the NFC element 267 may be configured to determine signal strength and the display 258 may be used as a signal strength indicator to display NFC signal strength to a user.

Figure 3A:
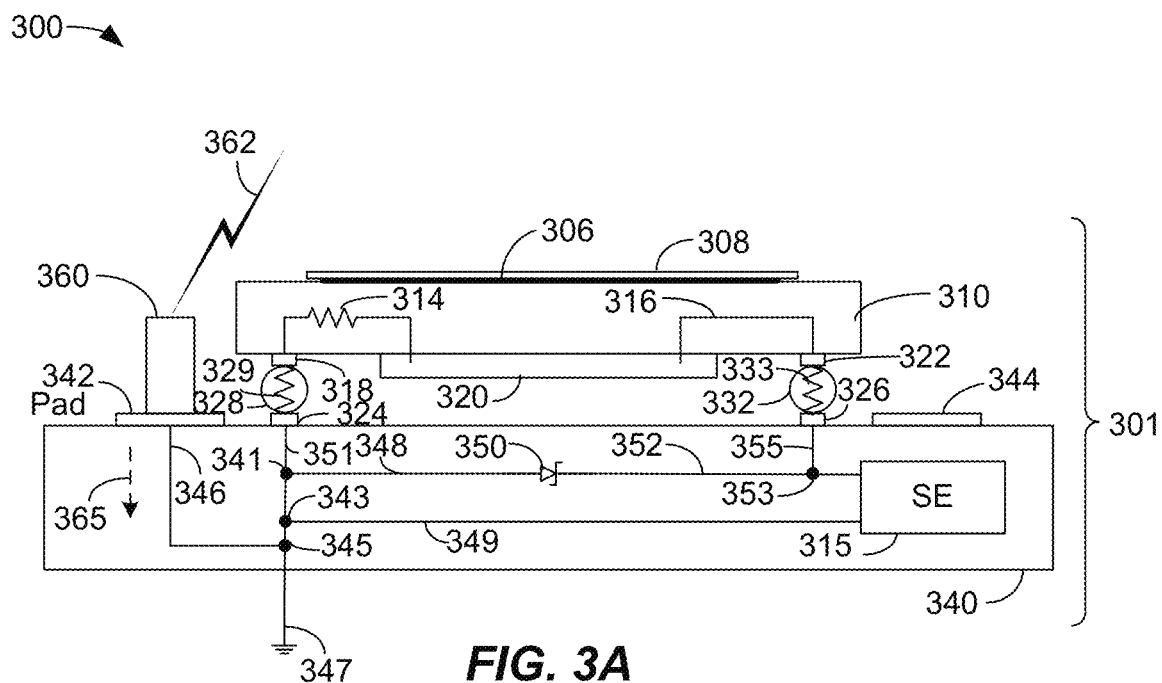
FIG. 3A is a diagram showing an exemplary embodiment of a system for biometric sensor electrostatic discharge (ESD) protection.

FIG. 3A is a diagram 300 showing an exemplary embodiment of a system 301 for biometric sensor electrostatic discharge (ESD) protection. The system 301 generally includes a biometric sensor 310 having a sensing area 306 mounted on a substrate 340. In some embodiments, the substrate 340 may be a printed circuit board (PCB). In other embodiments, the substrate 340 may be some or all of a smart card having an inlay including wiring or other electrical connections. The biometric sensor 310 may have an integrated circuit (IC) 320 mounted thereon. The biometric sensor 310 may be mounted to the substrate 340 using solder balls, exemplary ones of which are illustrated in FIG. 3A using reference numerals 328 and 332. The diagram 300 is generally a cross-sectional drawing, so only two solder balls 328 and 332 are illustrated in FIG. 3A. Typically, the solder balls form a two-dimensional field creating electrical connectivity between the biometric sensor 310 and the substrate 340. In an exemplary embodiment solder balls are shown herein as one manner of mounting a biometric sensor to a substrate. However, other ways of mounting a biometric sensor to a substrate include, for example only, anisotropic conductive film (ACF) or other technologies. Further, any resistance associated with solder or ACF may be parasitic in nature. Such parasitics may also give rise to harmful and significant voltage when large amounts of ESD current pass through.

An ESD coating 308 may be applied over some or all of the top of the sensing area 306. In an exemplary embodiment, the ESD coating 308 is applied over the top of the sensing area 306, but not to the edges of the top of the biometric sensor 310.

In an exemplary embodiment, the solder balls 328 and 332 may comprise a resistive characteristic, with exemplary resistances 329 and 333 shown for exemplary purposes. The biometric sensor 310 may be connected to the solder balls 328 and 332 using pads 318 and 322, respectively. Similarly, the substrate 340 may be connected to the solder balls 328 and 332 using pads 324 and 326, respectively.

The substrate 340 may be connected to the biometric sensor 310 and IC 320 through the solder ball 328 and resistive connection 314. The substrate 340 may also be connected to the biometric sensor 310 and IC 320 through the solder ball 332 and connection 316.

The substrate 340 may comprise the secure element (SE) 315 connected to the biometric sensor 310 over serial peripheral interface (SPI) connections 349, 348 and 352, nodes 341, 343 and 353, and connections 351 and 355. A transient voltage suppressor (TVS) diode 350 may be connected between the node 341 and the node 353 and form part of the SPI connection 348 and the SPI connection 352. The SE 315 may be connected to the node 343 over the SPI connection 349. The pad 324 may be connected to the node 341 over connection 351.

The substrate 340 may also comprise one or more conductive elements, an exemplary one of which is illustrated using reference numeral 360. In some embodiments, the conductive element 360 may be referred to as a "lightning rod" due to its effect of attracting ESD voltage. Although a single conductive element 360 is shown, more than one conductive element 360 may be implemented. The conductive element 360 may be connected to the substrate 340 using a circuit pad 342. The substrate 340 may be connected to a ground 347 at node 345. The conductive element 360 may also be connected to the ground 347 through the circuit pad 342 and over connection 346 to the node 345.

Figure 3B:
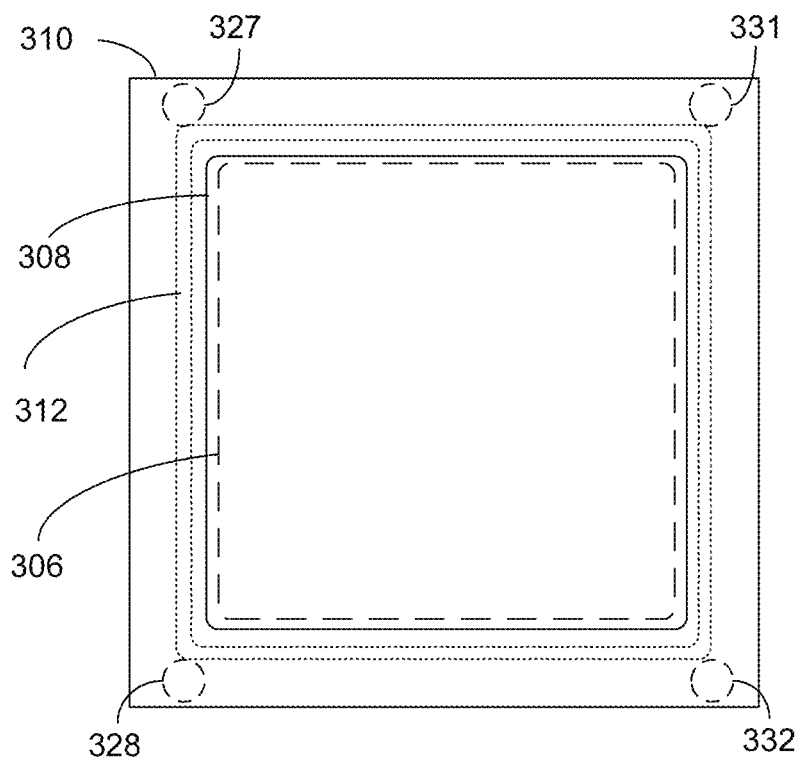
FIG. 3B is a diagram showing a plan view of a portion of the exemplary embodiment of a system for biometric sensor electrostatic discharge (ESD) protection of FIG. 3A.

FIG. 3B is a diagram showing a plan view of a portion of the exemplary embodiment of a system for biometric sensor electrostatic discharge (ESD) protection of FIG. 3A. In an exemplary embodiment, the biometric sensor 310 may optionally comprise an ESD ring 312, shown in dotted plan view in FIG. 3B to indicate that it is optional. In an exemplary embodiment, the ESD ring 312 may be a ring-shaped electrically conductive structure. The top surface of the sensor 310 excluding the ESD ring 312 may be covered by the ESD coating 308. The ESD ring 312 may form a ring-shaped electrically conductive structure configured to attract ESD voltage and may be referred to as an electricity attraction feature in some embodiments. In FIG. 3B, additional solder balls 327 and 331 are shown for illustrative purposes only. As mentioned above, the solder balls form a two-dimensional field creating electrical connectivity between the biometric sensor 310 and the substrate 340.

In an exemplary embodiment, a current may be induced in the vicinity of the biometric sensor 310 as a result of an ESD strike 362, which may strike the conductive element 360. In an exemplary embodiment, the conductive element 360 may be located with respect to the biometric sensor 310 so as to attract the ESD strike 362 so that the ESD strike 360 does not contact the biometric sensor 310. A current induced by the ESD strike 362 to the conductive element 360 can be conducted to ground 347 as shown using reference numeral 365, thereby bypassing the biometric sensor 310 and the IC 320. A current induced by the ESD strike 362 on the conductive element 360 can be conducted to ground 347 as shown using reference numeral 365, thereby bypassing the biometric sensor 310 and the IC 320. In this manner, a current induced by an ESD strike 362 in the vicinity of the biometric sensor 310 will not affect the IC 320 mounted on the biometric sensor 310. In this manner the path from the IC 320 to the SE 315 formed by the connection 316, the pad 322, the solder ball 332, the pad 326 and the connection 355 and node 353 will not experience an elevation in voltage or current as a result of the ESD strike 362 because the ESD strike 362 is attracted to the conductive element 360.

Figure 4:
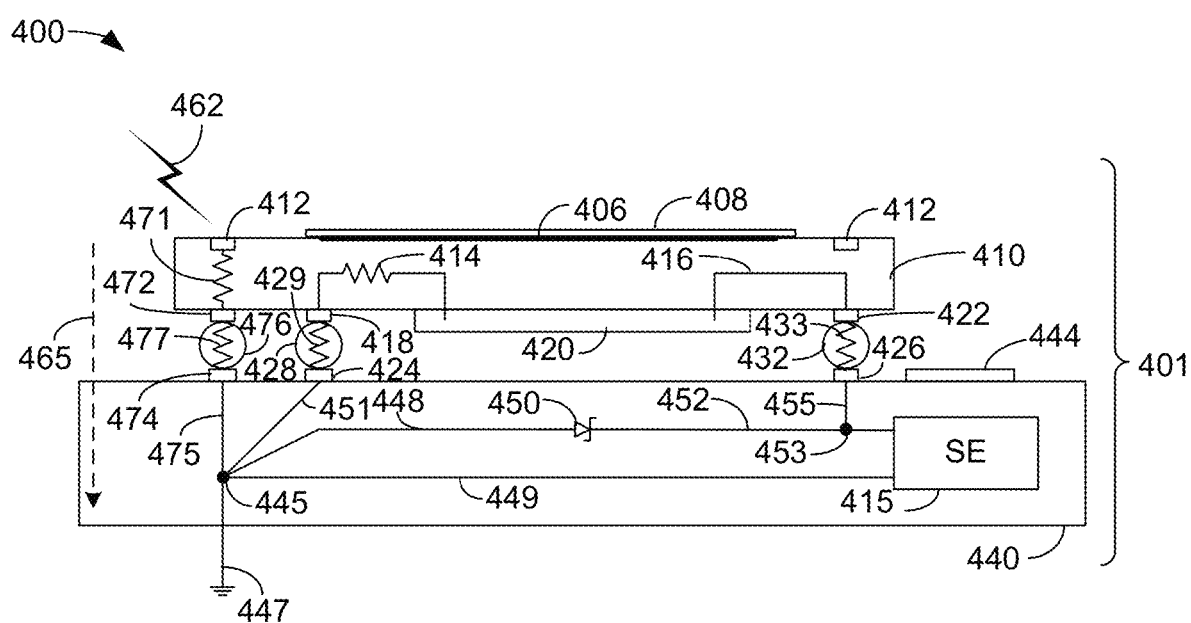
FIG. 4 is a diagram showing an exemplary embodiment of a system for biometric sensor electrostatic discharge (ESD) protection.

FIG. 4 is a diagram 400 showing an exemplary embodiment of a system 401 for biometric sensor electrostatic discharge (ESD) protection. Elements in FIG. 4 that are identical to elements in FIG. 3A are labeled with the same reference numerals. Elements in FIG. 4 that may have a similar function as an element in FIG. 3A or be an example implementation of an element in FIG. 3A are referred to using the nomenclature 4XX, where an element in FIG. 4 labeled 4XX corresponds to an element in FIG. 3A labeled 3XX.

The system 401 generally includes a biometric sensor 410 having a sensing area 406 mounted on a substrate 440. The biometric sensor 410 may also include an ESD ring 412 located on the biometric sensor 410. In an exemplary embodiment, the ESD ring 412 may be configured to attract an ESD strike. The biometric sensor 410 may also include an ESD coating 408 located over the sensing area 406. In some embodiments, the ESD coating 408 may be patterned so that it covers portions of the surface of the biometric sensor 410, some including the sensing area 406, but not covering the ESD ring 412. The biometric sensor 410 may have an integrated circuit (IC) 420 mounted thereon. The biometric sensor 410 may be mounted to the substrate 440 using solder balls, exemplary ones of which are illustrated in FIG. 4 using reference numerals 428, 432 and 476. The diagram 400 is generally a cross-sectional drawing, so only three solder balls 428, 432 and 476 are illustrated. Typically, the solder balls form a two-dimensional field creating electrical connectivity between the biometric sensor 410 and the substrate 440.

In an exemplary embodiment, the solder balls 428, 432 and 476 may comprise a resistive characteristic, with exemplary resistances 429, 433 and 477 shown for exemplary purposes only. The biometric sensor 410 may be connected to the solder balls 428, 432 and 476 using pads 418, 422 and 472, respectively. Similarly, the substrate 440 may be connected to the solder balls 428, 432 and 476 using pads 424, 426 and 474, respectively.

The substrate 440 may be connected to the biometric sensor 410 and IC 420 through the solder ball 428 and resistive connection 414. The substrate 440 may also be connected to the biometric sensor 410 and IC 420 through the solder ball 432 and connection 416.

In an exemplary embodiment, the substrate 440 may also be connected to an ESD ring 412 on the biometric sensor 410 through the solder ball 476 and resistive connection 477.

The substrate 440 may comprise the secure element (SE) 415 connected to the biometric sensor 410 over serial peripheral interface (SPI) connections 449, 448 and 452, nodes 453 and 445, and connections 451 and 455.

A transient voltage suppressor (TVS) diode 450 may be connected between the node 445 and the node 453, and may form a part of the SPI connection 448 and the SPI connection 452. The SE 415 may be connected to the node 445 over the SPI connection 449. The pad 424 may be connected to the node 445 over connection 451. In an exemplary embodiment, the solder pad 424 and the connection 451 may comprise some or all of a system ground.

The ESD ring 412 on the biometric sensor 410 may be connected to the pad 472 through a resistance 471. In some embodiments, the resistance 471 may be a parasitic resistance resulting from the connection between the ESD ring 412 and the pad 472. The pad 472 may be connected to the pad 474 through the solder ball 476 and the resistance 477. The pad 474 may be connected to the node 445 and the ground 447 over connection 475. In an exemplary embodiment, the ESD ring 412, the resistance 471, the pad 472, the pad 474, the solder ball 476, the resistance 477, the pad 474 and the connection 475 may be referred to as an ESD ground.

In an exemplary embodiment, an ESD strike 462 to the ESD ring 412 may induce a current in the vicinity of the biometric sensor 310. A current induced on the ESD ring 412 as a result of the ESD strike 462 can be conducted to the pad 472 through the resistance 471 and then to the pad 474 through the resistive element 477. In an exemplary embodiment, the solder pad 474 may comprise part of an ESD ground. In this manner, a current induced by an ESD strike 462 on the ESD ring 412 can be conducted to ground 447 as shown using reference numeral 465, thereby bypassing the biometric sensor 410 and the IC 420. In this manner, an ESD strike 462 to the biometric sensor 410 will not affect the IC 420 mounted on the biometric sensor 410.

In an exemplary embodiment, the resistance 471, pad 472, solder ball 476, pad 474 and connection 475 form a separate path to ground 447 for a current induced by an ESD strike 462 to the ESD ring 412. The path to ground formed by the resistance 471, pad 472, solder ball 476, pad 474 and connection 475 may be referred to as an ESD ground. In this manner the path from the IC 420 to the SE 415 formed by the connection 416, the pad 422, the solder ball 432, the pad 426 and the connection 455 and node 453 will not experience an elevation in voltage or current as a result of the ESD strike 462 to the ESD ring 412.

In an exemplary embodiment, the ESD ring 412 should be located as close to the sensing area 406 as practical to maximize the transfer of an ESD strike induced current toward the ESD ring 412. In an exemplary embodiment, the structure of the system 401 shown in FIG. 4 may still use an ESD coating 408, but the voltage capacity of the coating may be eased when compared to a structure without the described ESD protection including the ESD ring 412 and the path to ESD ground described herein. For example, for a 9.5 mm square sensing area 406 a distance from the center of the sensing area 406 to the ESD ring 412 may be on the order of 5 mm.

Figure 5:
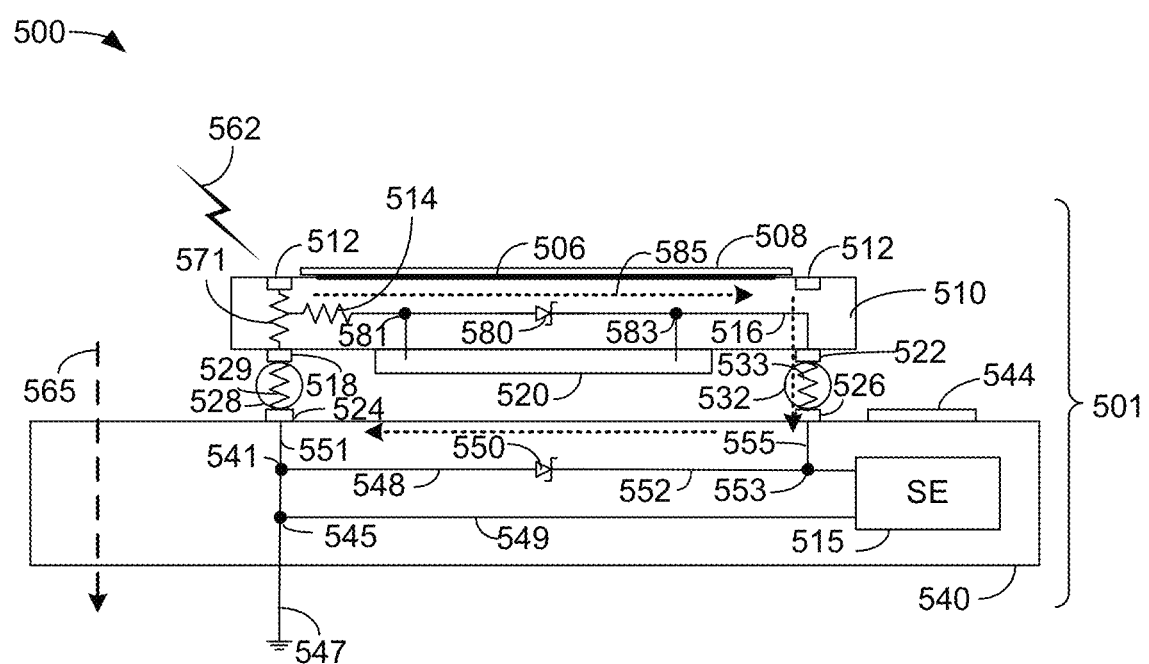
FIG. 5 is a diagram showing an exemplary embodiment of a system for biometric sensor electrostatic discharge (ESD) protection.

FIG. 5 is a diagram 500 showing an exemplary embodiment of a system 501 for biometric sensor electrostatic discharge (ESD) protection. Elements in FIG. 5 that are identical to elements in FIG. 3A or FIG. 4 are labeled with the same reference numerals. Elements in FIG. 5 that may have a similar function as an element in FIG. 3A or FIG. 4, or be an example implementation of an element in FIG. 3A or FIG. 4 are referred to using the nomenclature 5XX, where an element in FIG. 5 labeled 5XX corresponds to an element in FIG. 3A labeled 3XX or an element in FIG. 4 labeled 4XX.

The system 501 generally includes a biometric sensor 510 having a sensing area 506 mounted on a substrate 540. The biometric sensor 510 may have an integrated circuit (IC) 520 mounted thereon. In some embodiments, an ESD coating 508 may be located over portions of the biometric sensor 510 as described herein. The biometric sensor 510 may be mounted to the substrate 540 using solder balls, exemplary ones of which are illustrated in FIG. 5 using reference numerals 528 and 532. The diagram 500 is generally a cross-sectional drawing, so only two solder balls 528 and 532 are illustrated. Typically, the solder balls form a two-dimensional field creating electrical connectivity between the biometric sensor 510 and the substrate 540.

In an exemplary embodiment, the solder balls 528 and 532 may comprise a resistive characteristic, with exemplary resistances 529 and 533 shown for exemplary purposes. The biometric sensor 510 may be connected to the solder balls 528 and 532 using pads 318 and 522, respectively. Similarly, the substrate 540 may be connected to the solder balls 528 and 532 using pads 524 and 526, respectively.

The substrate 540 may be connected to the biometric sensor 510 and IC 520 through the solder ball 528 a resistance 571 and a resistance 514. The substrate 540 may also be connected to the biometric sensor 510 and IC 520 through the solder ball 532 and connection 516. In some embodiments, the resistance 571 and the resistance 514 may be parasitic resistances resulting from the connection between the ESD ring 512 and the pad 518, and between the ESD ring 512 and the node 581.

In an exemplary embodiment, the biometric sensor 510 may also comprise a TVS diode 580 connected between a node 581 and a node 583. The node 581 may also be connected to the IC 520 and the resistance 514. The node 583 may also be connected to the connection 516.

The substrate 540 may comprise the secure element (SE) 515 connected to the biometric sensor 510 over serial peripheral interface (SPI) connections 549, 548 and 552, nodes 541 and 553, and connections 551 and 555. A transient voltage suppressor (TVS) diode 550 may be connected between the node 541 and the node 553, and may form a part of the SPI connection 548 and the SPI connection 552. The SE 515 may be connected to the node 545 over the SPI connection 549. The pad 524 may be connected to the node 541 over connection 551.

In an exemplary embodiment, a current induced by an ESD strike 562 to the ESD ring 512 may build in the vicinity of the biometric sensor 510. A current inducted by the ESD strike 562 in the vicinity of the ESD ring 512 may be transferred to the resistance 571 and then through multiple paths to ground 547. For example, a first exemplary path 565 to ground (shown in dashed line) may comprise the resistance 571, the solder ball 528 having the resistance 529, the connection 551 and the nodes 541 and 545, to ground 547. Another exemplary path 585 to ground (shown in multiple sections of dotted line) for a current induced by the ESD strike 562 may comprise some or all of the resistance 571, the resistance 514, the TVS diode 580, the connection 516, the solder ball 532 having the resistance 533, the connection 555, the connection 552, the TVS diode 550, the connection 548 and the nodes 541 and 545, to ground 547. In an exemplary embodiment, the TVS diode 580 can be used to shunt a current induced by the ESD strike 562 to the ESD ring 512 around the IC 520 to ground 547.

Figure 6:
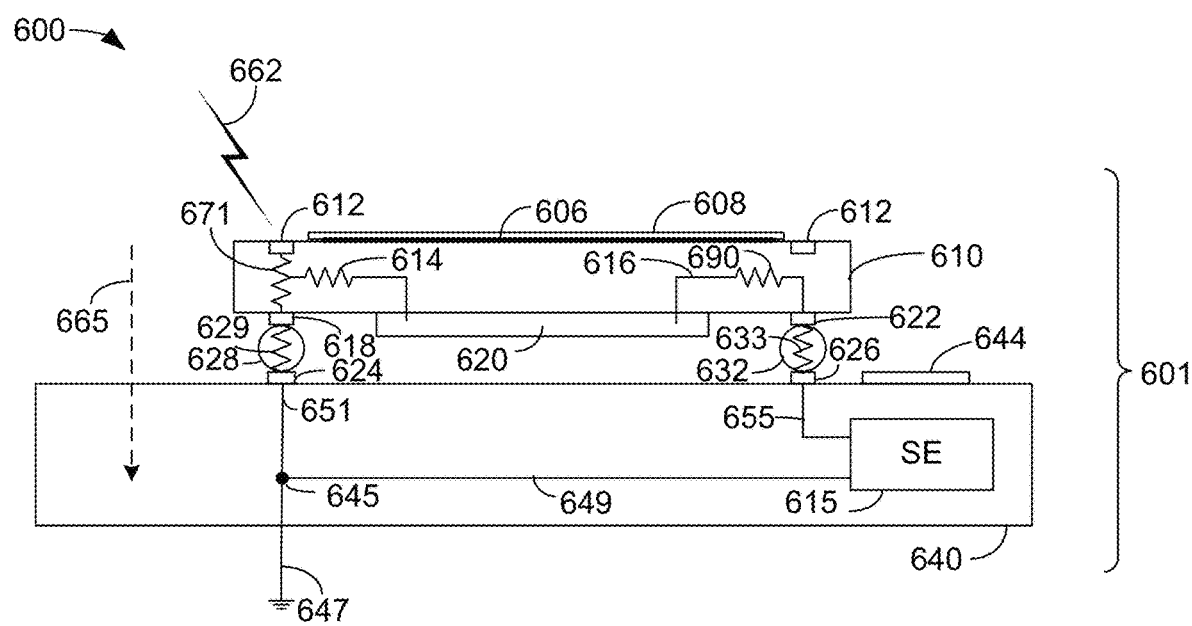
FIG. 6 is a diagram showing an exemplary embodiment of a system for biometric sensor electrostatic discharge (ESD) protection.

FIG. 6 is a diagram 600 showing an exemplary embodiment of a system 601 for biometric sensor electrostatic discharge (ESD) protection. Elements in FIG. 6 that are identical to elements in FIG. 3A, FIG. 4 or FIG. 5 are labeled with the same reference numerals. Elements in FIG. 6 that may have a similar function as an element in FIG. 3A, FIG. 4 or FIG. 5, or be an example implementation of an element in FIG. 3A, FIG. 4 or FIG. 5 are referred to using the nomenclature 6XX, where an element in FIG. 6 labeled 6XX corresponds to an element in FIG. 3A labeled 3XX, an element in FIG. 4 labeled 4XX or an element in FIG. 5 labeled 5XX.

The system 601 generally includes a biometric sensor 610 having a sensing area 606 mounted on a substrate 640. The biometric sensor 610 may have an integrated circuit (IC) 620 mounted thereon. In some embodiments, an ESD coating 608 may be located over portions of the biometric sensor 610 as described herein. The biometric sensor 610 may be mounted to the substrate 640 using solder balls, exemplary ones of which are illustrated in FIG. 6 using reference numerals 628 and 632. The diagram 600 is generally a cross-sectional drawing, so only two solder balls 628 and 632 are illustrated. Typically, the solder balls form a two-dimensional field creating electrical connectivity between the biometric sensor 610 and the substrate 640.

In an exemplary embodiment, the solder balls 628 and 632 may comprise a resistive characteristic, with exemplary resistances 629 and 633 shown for exemplary purposes. The biometric sensor 610 may be connected to the solder balls 628 and 632 using pads 618 and 622, respectively. Similarly, the substrate 640 may be connected to the solder balls 628 and 632 using pads 624 and 626, respectively.

The substrate 640 may be connected to the biometric sensor 610 and IC 620 through the solder ball 628 a resistance 671 and a resistance 614. The substrate 640 may also be connected to the biometric sensor 610 and IC 620 through the solder ball 632, a resistance 690, and the connection 616. In an exemplary embodiment, the resistance 690 may be implemented as a discrete resistor or a parasitic resistance and may be configured to limit current that may be applied to the SPI connection 655 resulting from an ESD strike 662.

The substrate 640 may comprise the secure element (SE) 615 connected to the biometric sensor 610 over serial peripheral interface (SPI) connections 655 and 649, node 645 and connection 651.

In an exemplary embodiment, a current induced by the ESD strike 662 on the ESD ring 612 may build in the vicinity of the biometric sensor 610. A current induced by the ESD strike 662 on the ESD ring 612 may be transferred to the resistance 671 and then through the solder ball 628 having the resistance 629, the connection 651 and the node 645 to ground 647. In an exemplary embodiment, the resistance 690 may be configured to limit current that may be applied to the SPI connection 655 resulting from an ESD strike 662. For example, the high current generated by an ESD strike causes a voltage to be generated across the resistance 690. When there is significant ground voltage difference between the IC 620 on the biometric sensor 610 and the IC (the SE 615) on the substrate 640, then TVS diodes on the SPI lines (such as TVS diode 550 in FIG. 5) can become forward biased and carry enough of the ESD current to cause damage. The resistance 690 can be used to maintain any ESD current under a level at which it may cause damage to the biometric sensor 60 or the IC 620.

In this manner, a voltage induced by the ESD strike 662 to the ESD ring 612 can be conducted to ground 647 as shown by reference numeral 665, thereby bypassing the biometric sensor 610 and the IC 620. In this manner, an ESD strike 662 to the biometric sensor 612 will not affect the IC 620 mounted on the biometric sensor 610.

Figure 7:
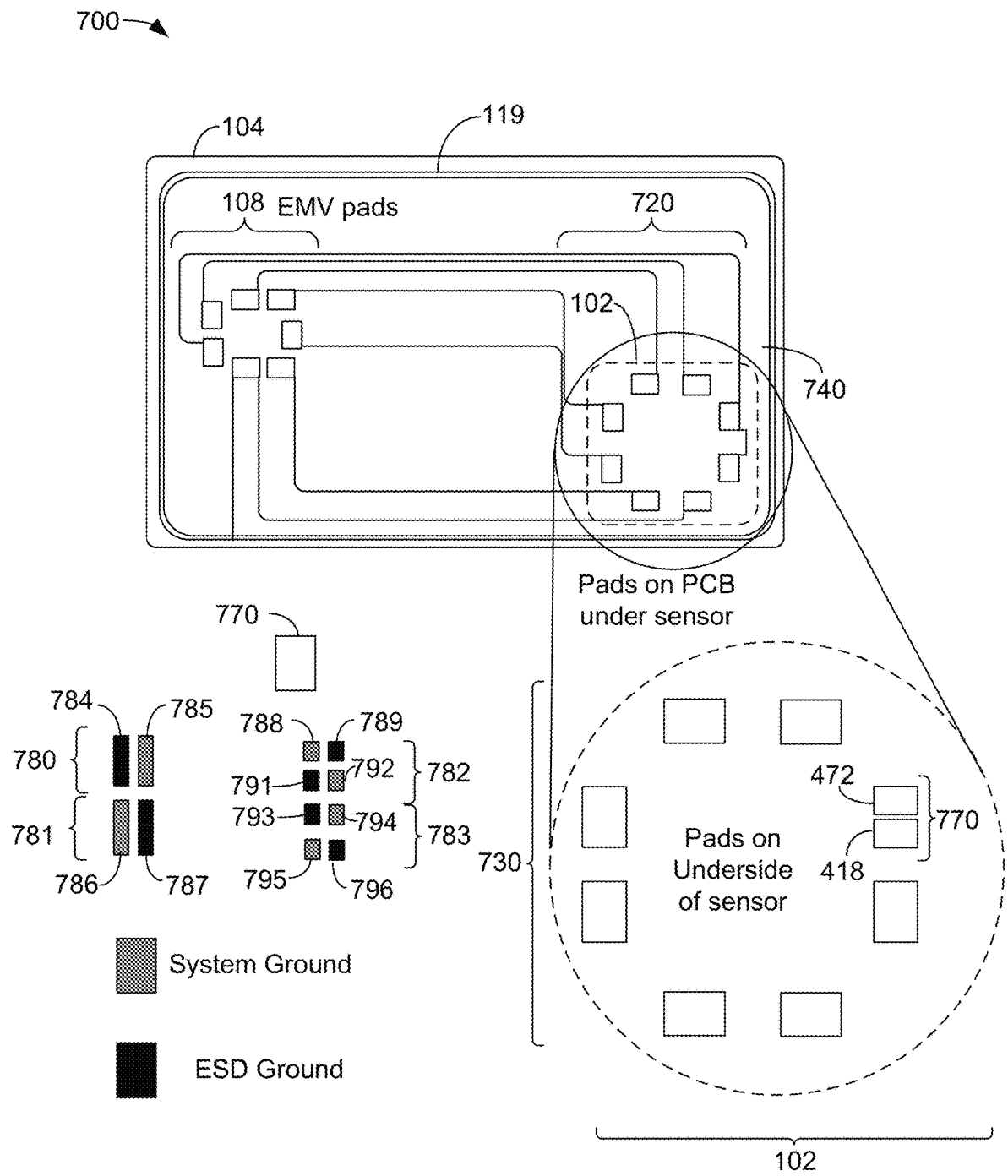
FIG. 7 is a diagram showing an exemplary embodiment of a smart card that may be implemented in a system for biometric sensor electrostatic discharge (ESD) protection.

FIG. 7 is a diagram 700 showing an exemplary embodiment of a smart card 104 that may be implemented in a system for biometric sensor electrostatic discharge (ESD) protection. In an exemplary embodiment, the diagram 700 shows a circuitry wiring layer where the EMV pads 108 are connected to an array of circuit pads 720. The array of circuit pads 720 may be located on the substrate 740 below, or underneath, the biometric sensor 102, which is shown in dashed line. In an exemplary embodiment, the array of circuit pads 720 may be located on or may be fabricated as part of an interconnect or a wiring inlay that may be associated with the smart card 104.

An array of circuit pads 730 is also shown. The array of circuit pads 730 may be located on the surface of the biometric sensor 102 that mounts to the substrate 740.

In an exemplary embodiment, to facilitate the dual path to ground shown in FIG. 4 (e.g., the solder ball 428 and pad 418; and the solder ball 476 and pad 472) an exemplary circuit pad 770 in the array 730 may be fabricated in multiple parts. For example, the circuit pad 770 may comprise the circuit pad 418 and the circuit pad 472 on the surface of the biometric sensor 410 (FIG. 4) that mounts to the substrate 440 via the solder balls 428 and 476 (FIG. 4), respectively.

The circuit pad 770 may be divided in a number of different ways into a number of different segments, with circuit pads 780, 781, 782 and 783 shown for exemplary purposes only. For example, circuit pad 780 may comprise a first segment 784 configured to carry ESD ground, and second segment 785 configured to carry system ground. Alternatively, circuit pad 781 may comprise a first segment 786 configured to carry system ground, and second segment 787 configured to carry ESD ground.

In other exemplary embodiments, circuit pad 782 may comprise first segment 788 and second segment 792 configured to carry system ground and third segment 789 and fourth segment 791 configured to carry ESD ground. Alternatively, circuit pad 783 may comprise first segment 793 and second segment 796 configured to carry ESD ground and third segment 795 and fourth segment 794 configured to carry system ground. Other configurations of divided circuit pads may be implemented with those in FIG. 7 shown as examples only.

Figure 8:
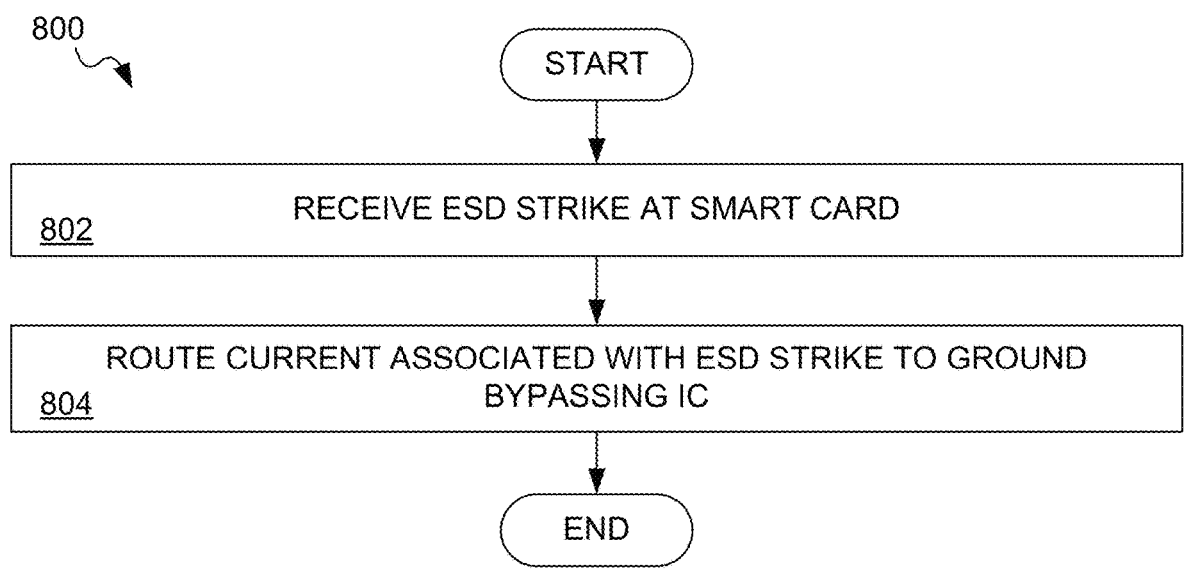
FIG. 8 is a flow chart describing an example of the operation of a method for ESD protection in a smart card.

FIG. 8 is a flow chart describing an example of the operation of a method 800 for ESD protection in a smart card. The blocks in the method 800 can be performed in or out of the order shown, and in some embodiments, can be performed at least in part in parallel.

In block 802, an ESD strike is received at a smart card. For example, the smart card 104 may receive an ESD strike 362.

In block 804, a current induced by the ESD strike is routed to ground bypassing an integrated circuit (IC) on the smart card. For example, current induced by the ESD strike 362 may be routed to ground 347 bypassing the IC 320.

Figure 9:
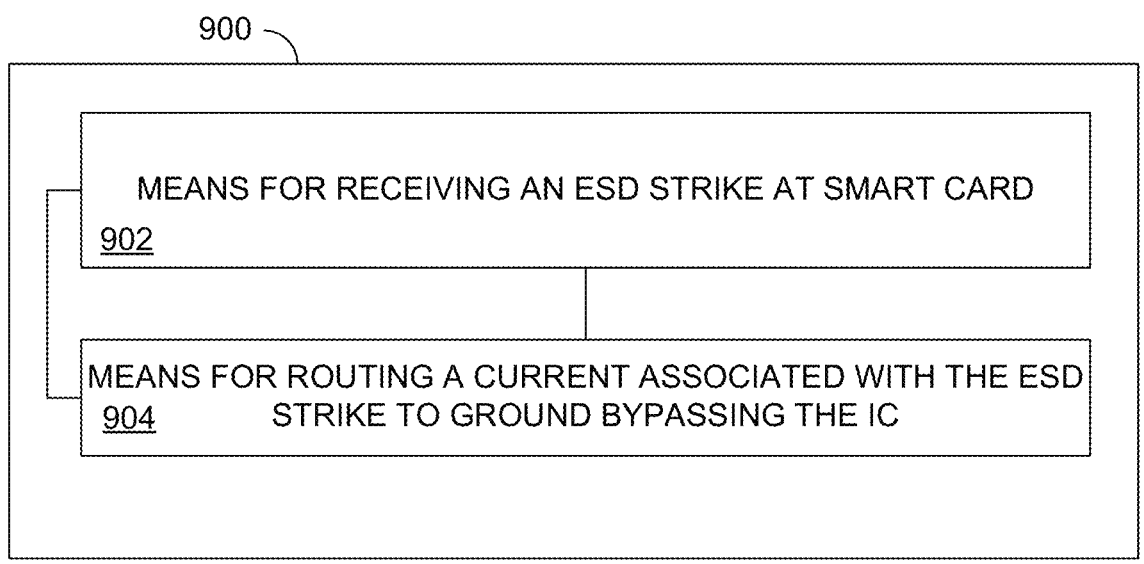
FIG. 9 is a functional block diagram of an apparatus for ESD protection in a smart card.

FIG. 9 is a functional block diagram of an apparatus 900 for ESD protection in a smart card. In an exemplary embodiment, the apparatus 900 comprises means 902 for receiving an ESD strike at a smart card. In certain embodiments, the means 902 for receiving an ESD strike at a smart card can be configured to perform one or more of the functions described in operation block 802 of method 800 (FIG. 8). In an exemplary embodiment, the means 902 for receiving an ESD strike at a smart card may comprise the ESD ring 412 and/or the conductive element 360 receiving an ESD strike 362.

The apparatus 900 also comprises means 904 for routing a current induced by the ESD strike to ground bypassing an integrated circuit (IC) on the smart card.

In certain embodiments, the means 904 for routing a current induced by the ESD strike to ground bypassing an integrated circuit (IC) on the smart card can be configured to perform one or more of the functions described in operation block 804 of method 800 (FIG. 8). In an exemplary embodiment, the means 904 for routing a current induced by the ESD strike to ground bypassing an integrated circuit (IC) on the smart card may comprise the conductive element 360 routing a current induced by the ESD strike 362 to ground 347, bypassing the IC 320.

Implementation examples are described in the following numbered clauses:

1. A system for electrostatic discharge (ESD) protection on a smart card, comprising: a substrate having a biometric sensor mounted thereon; and a conductive element mounted to the substrate wherein a current induced by an ESD strike is conducted to a ground through the conductive element and the substrate.
2. The system of clause 1, wherein the conductive element is a metallic structure located in proximity to the biometric sensor and a path to ground comprises a direct electrical connection through the substrate.
3. The system of clause 1, wherein the conductive element is a ring-shaped electrically conductive structure connected to a resistance and a path to ground comprises the resistance, a first solder ball having a resistive characteristic and a direct electrical connection through the substrate.
4. The system of clause 1, wherein the conductive element is a first resistance and a path to ground comprises a first path to ground through the first resistance, a first solder ball having a resistive characteristic and a direct path through the substrate; and a second path to ground comprises a first suppressor diode (TVS) diode located in the biometric sensor, a second solder ball having a resistive characteristic and a second TVS diode located on the substrate.
5. The system of clause 1, wherein the conductive element is a first resistance and a path to ground comprises the first resistance, a first solder ball having a resistive characteristic and a direct path through the substrate, and the biometric sensor comprises a second resistance configured to prevent a high ESD current on a communication line in the substrate.
6. The system of clause 3, further comprising at least a second solder ball, wherein the first solder ball is mounted to a first circuit pad that comprises an ESD ground and the second solder ball is mounted to a second circuit pad that comprises a system ground.
7. The system of clause 6, wherein the first circuit pad that comprises the ESD ground and the second circuit pad that comprises the system ground are divided from a single circuit pad in an array of circuit pads.
8. A method for electrostatic discharge (ESD) protection in a smart card, comprising: receiving an ESD strike on a smart card; and routing a current associated with the ESD strike to a ground bypassing an integrated circuit (IC) located on the smart card.
9. The method of clause 8, further comprising routing the current associated with the ESD strike to a ground through a conductive element comprising a metallic structure located in proximity to a biometric sensor on the smart card, wherein a path to ground comprises a direct electrical connection through a substrate associated with the smart card.
10. The method of clause 8, further comprising routing the current associated with the ESD strike to a ground through a conductive element comprising a ring-shaped electrically conductive structure connected to a resistance, wherein a path to ground comprises the resistance, a first solder ball having a resistive characteristic and a direct electrical connection through a substrate associated with the smart card.
11. The method of clause 8, further comprising routing the current associated with the ESD strike to a ground through a conductive element comprising a first resistance, wherein a path to ground comprises a first path to ground through the first resistance, a first solder ball having a resistive characteristic and a direct path through a substrate associated with the smart card; and a second path to ground comprises a first suppressor diode (TVS diode) located in the biometric sensor, a second solder ball having a resistive characteristic and a second TVS diode located on a substrate associated with the smart card.
12. The method of clause 8, further comprising routing the current associated with the ESD strike to a ground through a conductive element comprising a first resistance and a path to ground comprises the first resistance, a first solder ball having a resistive characteristic and a direct path through a substrate associated with the smart card, and the biometric sensor comprises a second resistance configured to prevent a voltage increase on a communication line in the substrate.
13. The method of clause 10, wherein the path to ground further comprises at least a second solder ball, wherein the first solder ball is mounted to a first circuit pad that comprises an ESD ground and the second solder ball is mounted to a second circuit pad that comprises a system ground.
14. The method of clause 13, wherein the first circuit pad that comprises the ESD ground and the second circuit pad that comprises the system ground are divided from a single circuit pad in an array of circuit pads.
15. A device for electrostatic discharge (ESD) protection in a smart card, comprising: means for receiving an ESD strike on a smart card; and means for routing a current associated with the ESD strike to a ground bypassing an integrated circuit (IC) located on the smart card.
16. The device of clause 15, wherein the means for routing the current associated with the ESD strike to a ground comprises a conductive element comprising a metallic structure located in proximity to a biometric sensor on the smart card, wherein a path to ground comprises a direct electrical connection through a substrate associated with the smart card.
17. The device of clause 15, wherein the means for routing the current associated with the ESD strike to a ground comprises a conductive element comprising a ring-shaped electrically conductive structure connected to a resistance, wherein a path to ground comprises the resistance, a first solder ball having a resistive characteristic and a direct electrical connection through a substrate associated with the smart card.
18. The device of clause 15, wherein the means for routing the current associated with the ESD strike to a ground comprises a conductive element comprising a first resistance, wherein a path to ground comprises a first path to ground through the first resistance, a first solder ball having a resistive characteristic and a direct path through a substrate associated with the smart card; and a second path to ground comprises a first suppressor diode (TVS diode) located in the biometric sensor, a second solder ball having a resistive characteristic and a second TVS diode located on the substrate.
19. The device of clause 15, wherein the means for routing the current associated with the ESD strike to a ground comprises a conductive element comprising a first resistance and a path to ground comprises the first resistance, a first solder ball having a resistive characteristic and a direct path through a substrate associated with the smart card, and the biometric sensor comprises a second resistance configured to prevent a voltage increase on a communication line in the substrate.

20. The device of clause 17, wherein the means for routing the current associated with the ESD strike to a ground comprises at least a second solder ball, wherein the first solder ball is mounted to a first circuit pad that comprises an ESD ground and the second solder ball is mounted to a second circuit pad that comprises a system ground.

21. The device of clause 20, wherein the first circuit pad that comprises the ESD ground and the second circuit pad that comprises the system ground are divided from a single circuit pad in an array of circuit pads.

One or more illustrative or exemplary embodiments of the invention have been described above. However, it is to be understood that the invention is defined by the appended claims and is not limited to the specific embodiments described.

What is claimed is:

1. A system for electrostatic discharge (ESD) protection on a smart card, comprising:
   a substrate having a biometric sensor and an integrated circuit (IC) mounted thereon; and
   a conductive element mounted to the substrate, wherein a current induced by an ESD strike is conducted to a ground through the conductive element and the substrate through a separate electrostatic discharge (ESD) path bypassing the IC and a sensing area of the biometric sensor, wherein the conductive element is a ring-shaped electrically conductive structure connected to a resistance and the separate ESD path to ground comprises the resistance, a first solder ball having a resistive characteristic and a direct electrical connection bypassing the IC and the sensing area of the biometric sensor through the substrate.

2. The system of claim 1, wherein the conductive element is a first resistance and the separate ESD path to ground comprises a first path to ground through the first resistance, a first solder ball having a resistive characteristic and a direct path through the substrate bypassing the IC and the sensing area of the biometric sensor; and a second path to ground comprises a first suppressor diode (TVS) diode located in the biometric sensor, a second solder ball having a resistive characteristic and a second TVS diode located on the substrate.

3. The system of claim 1, wherein the conductive element is a first resistance and the separate ESD path to ground comprises the first resistance, a first solder ball having a resistive characteristic and a direct path through the substrate bypassing the IC and the sensing area of the biometric sensor, and the biometric sensor comprises a second resistance configured to prevent a high ESD current on a communication line in the substrate.

4. The system of claim 1, further comprising at least a second solder ball, wherein the first solder ball is mounted to a first circuit pad that comprises an ESD ground and the second solder ball is mounted to a second circuit pad that comprises a system ground.

5. The system of claim 4, wherein the first circuit pad that comprises the ESD ground and the second circuit pad that comprises the system ground comprise different segments of a single circuit pad in an array of circuit pads.

6. A method for electrostatic discharge (ESD) protection in a smart card, comprising:
   receiving an ESD strike on the smart card;
   routing a current associated with the ESD strike to a ground bypassing an integrated circuit (IC) located on the smart card through a plurality of paths including at least one separate electrostatic discharge (ESD) path to ground; and
   routing the current associated with the ESD strike to the ground through a conductive element comprising a ring-shaped electrically conductive structure connected to a resistance, wherein a path to ground comprises the resistance, a first solder ball having a resistive characteristic and a direct electrical connection through a substrate associated with the smart card.

7. The method of claim 6, further comprising routing the current associated with the ESD strike to the ground through a conductive element comprising a first resistance, wherein a path ground comprises a first path to ground through the first resistance, a first solder ball having a resistive characteristic and a direct path through a substrate associated with the smart card; and a second path to ground comprises a first suppressor diode (TVS diode) located in the biometric sensor, a second solder ball having a resistive characteristic and a second TVS diode located on a substrate associated with the smart card.

8. The method of claim 6, further comprising routing the current associated with the ESD strike to the ground through a conductive element comprising a first resistance and a path to ground comprises the first resistance, a first solder ball having a resistive characteristic and a direct path through a substrate associated with the smart card, and the biometric sensor comprises a second resistance configured to prevent a voltage increase on a communication line in the substrate.

9. The method of claim 6, wherein the path to ground further comprises at least a second solder ball, wherein the first solder ball is mounted to a first circuit pad that comprises an ESD ground and the second solder ball is mounted to a second circuit pad that comprises a system ground.

10. The method of claim 9, wherein the first circuit pad that comprises the ESD ground and the second circuit pad that comprises the system ground comprise different segments of a single circuit pad in an array of circuit pads.

11. A device for electrostatic discharge (ESD) protection in a smart card, comprising:
    means for receiving an ESD strike on the smart card; and
    means for routing a current associated with the ESD strike to a ground bypassing an integrated circuit (IC) located on the smart card through a plurality of paths including at least one separate electrostatic discharge (ESD) path to ground, wherein the means for routing the current associated with the ESD strike to the separate ESD path to ground comprises a conductive element comprising a ring-shaped electrically conductive structure connected to a resistance, wherein the separate ESD path to ground comprises the resistance, a first solder ball having a resistive characteristic and a direct electrical connection through a substrate associated with the smart card.

12. The device of claim 11, wherein the means for routing the current associated with the ESD strike to the separate ESD path to ground comprises a conductive element comprising a first resistance, wherein the separate ESD path to ground comprises a first path to ground through the first resistance, a first solder ball having a resistive characteristic and a direct path through a substrate associated with the smart card; and a second path to ground comprises a first suppressor diode (TVS diode) located in the biometric sensor, a second solder ball having a resistive characteristic and a second TVS diode located on the substrate.

13. The device of claim 11, wherein the means for routing the current associated with the ESD strike to the separate ESD path to ground comprises a conductive element comprising a first resistance and the separate ESD path to ground comprises the first resistance, a first solder ball having a resistive characteristic and a direct path through a substrate associated with the smart card, and the biometric sensor comprises a second resistance configured to prevent a voltage increase on a communication line in the substrate.

14. The device of claim 11, wherein the means for routing the current associated with the ESD strike to the separate ESD path to ground comprises at least a second solder ball, wherein the first solder ball is mounted to a first circuit pad that comprises an ESD ground and the second solder ball is mounted to a second circuit pad that comprises a system ground.

15. The device of claim 14, wherein the first circuit pad that comprises the ESD ground and the second circuit pad that comprises the system ground comprise different segments of a single circuit pad in an array of circuit pads.

\* \* \* \* \*